United States Patent
Martens et al.

[11] Patent Number: 5,534,607
[45] Date of Patent: Jul. 9, 1996

[54] GAS PHASE POLYMERISATION PROCESS

[75] Inventors: Andre Martens, Martigues; Frederic R. M. M. Morterol, Sausset-Les-Pins; Charles Raufast, Martigues, all of France

[73] Assignee: BP Chemicals Limited, London, England

[21] Appl. No.: 454,616

[22] Filed: May 31, 1995

Related U.S. Application Data

[63] Continuation of Ser. No. 320,838, Oct. 7, 1994, abandoned, which is a continuation of Ser. No. 95,360, Jul. 21, 1993, abandoned, which is a continuation of Ser. No. 746,474, Aug. 16, 1991, abandoned.

[30] Foreign Application Priority Data

Aug. 31, 1990 [FR] France .................................. 90 11058

[51] Int. Cl.$^6$ .................................................. C08F 2/34
[52] U.S. Cl. ........................... 526/88; 526/116; 526/159; 526/348.6; 526/901; 526/904
[58] Field of Search .............................. 526/88, 116, 159, 526/901, 904, 348.6

[56] References Cited

U.S. PATENT DOCUMENTS

| | | | |
|---|---|---|---|
| 3,023,203 | 2/1962 | Dye ........................................ | 260/94.9 |
| 4,748,221 | 5/1988 | Collomb et al. .......................... | 526/88 |
| 4,780,443 | 10/1988 | Matsuura et al. ....................... | 526/125 |
| 4,882,400 | 11/1989 | Dumain et al. ........................... | 526/901 |
| 5,028,669 | 7/1991 | Rowley ..................................... | 526/67 |
| 5,028,670 | 7/1991 | Chinh ....................................... | 526/73 |
| 5,104,838 | 4/1992 | Fujita et al. ............................. | 526/119 |

FOREIGN PATENT DOCUMENTS

| | | |
|---|---|---|
| 0376559 | 7/1990 | European Pat. Off. . |
| 45-029301 | 8/1974 | Japan . |
| 475861 | 5/1976 | U.S.S.R. . |

*Primary Examiner*—David W. Wu
*Attorney, Agent, or Firm*—Brooks Haidt Haffner & Delahunty

[57] ABSTRACT

The present invention relates to a continuous process for the polymerization of an alpha-olefin having from 2 to 12 carbon atoms, which is carried out in a gas phase polymerization reactor by bringing a gaseous reaction mixture, containing the alpha-olefin to be polymerized, into contact with a catalyst system of the Ziegler-Natta type consisting of a solid catalyst comprising at least one compound of a transition metal belonging to groups IV, V or VI of the Periodic Table, of the elements, and of a cocatalyst comprising at least one organometallic compound of a metal belonging to groups II or III of the Periodic Table in which the polymerization reactor is fed with alpha-olefin at a constant rate.

13 Claims, 1 Drawing Sheet

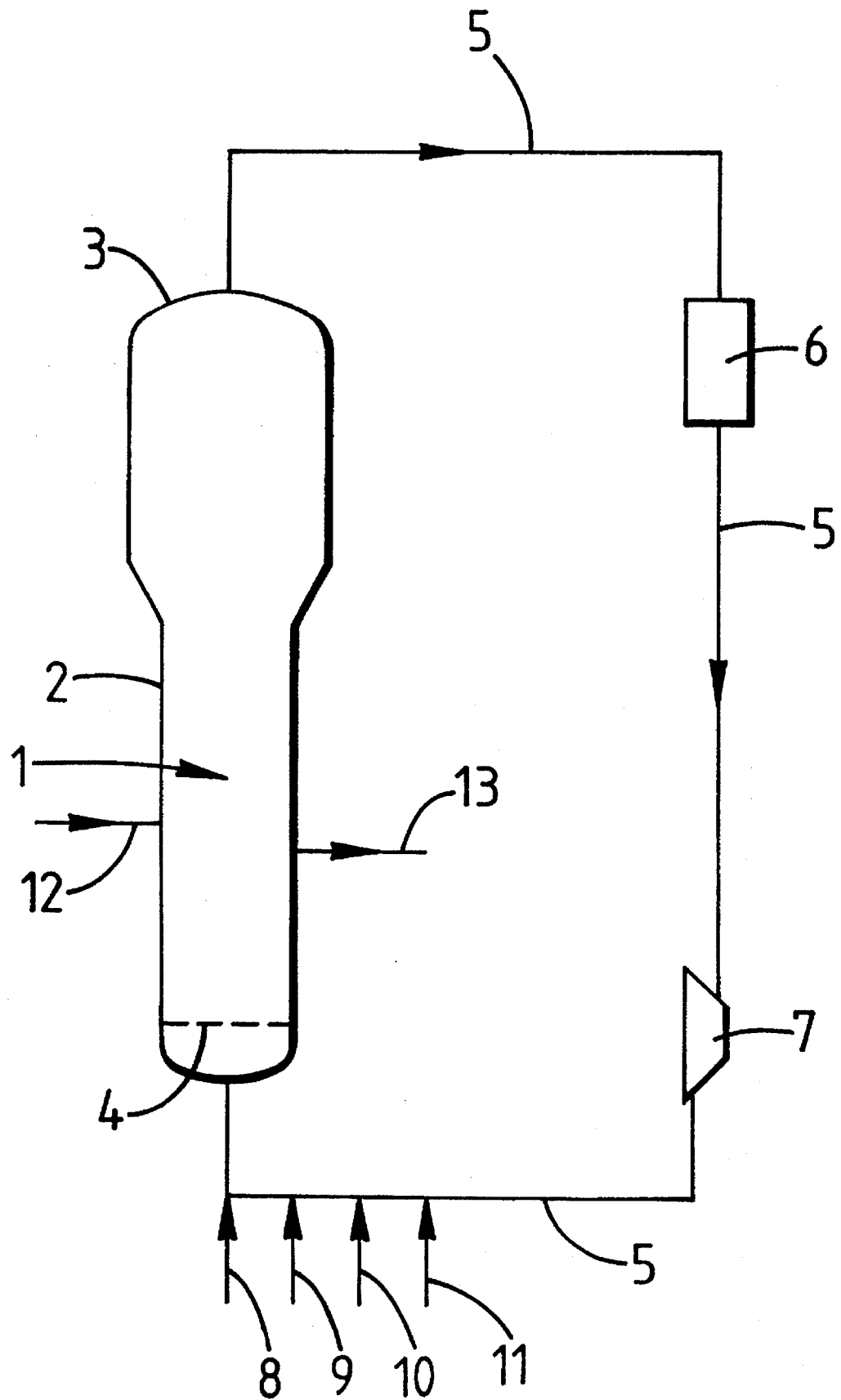

GAS PHASE POLYMERISATION PROCESS

This application is a continuation of application Ser. No. 08/320,838, filed on Oct. 7, 1994, which is a continuation of application Ser. No. 08/095,360, filed on Jul. 21, 1993, which is a continuation of application Ser. No. 07/746,474, filed on Aug. 16, 1991, all now abandoned.

The present invention relates to an alpha-olefin polymerization process carried out in a gas phase polymerization reactor fed with alpha-olefin and with a catalyst based on a transition metal.

It is known to polymerize continuously one or more alpha-olefins, such as for example ethylene or propylene, in the gas phase, in a reactor with a fluidized and/or mechanically agitated bed, in the presence of a catalyst based on a transition metal belonging to groups IV, V or VI of the Periodic Table of the elements, in particular in the presence of a catalyst of the Ziegler-Natta type. The polymer particles which are being formed are kept in the fluidized and/or agitated state in a gaseous reaction mixture containing the alpha-olefin or alpha-olefins which are introduced into the reactor. The catalyst is introduced continuously or intermittently into the reactor while the polymer constituting the fluidized and/or mechanically agitated bed is withdrawn from the reactor, again continuously or intermittently. Generally, the gaseous mixture leaves through the top of the reactor and is recycled to the reactor through a recycle conduit and a compressor. During this recycling the gaseous mixture is generally cooled with the aid of a heat exchanger so as to remove the heat produced during the polymerisation reaction.

It is known, according to EP-A-376 559 to carry out a gas phase polymerization process by maintaining substantially constant certain operating conditions. This is an example of the known processes in which the partial pressures of the main constituents of the gaseous reaction mixture as well as the total pressure of this gaseous reaction mixture are maintained constant. However in this case it has been found, that small variations in the progress of the polymerization can cause an unexpected increase in the quantity of heat evolved by the polymerization reaction. These small variations in the polymerization conditions can result especially from slight unavoidable variations in the quality of the catalyst or of the alpha-olefins employed in the reaction, or from variations in the feed rate of the catalyst or withdrawal rate of the polymer produced, the residence time of the polymer in the reactor or else the composition of the gaseous reaction mixture. These variations in the progress of the polymerization are particularly troublesome in a gas phase polymerization process as compared with a slurry or solution polymerization process, because of the fact that the heat exchange capacity of a gas phase is much lower than that of a liquid phase. Thus, an increase in the quantity of heat which cannot be removed sufficiently rapidly and efficiently by the gaseous reaction mixture can give rise to the appearance of hot spots in the bed and to the formation of agglomerates caused by molten polymer. When hot spots appear in the bed, it is generally too late to prevent the formation of agglomerates. Nevertheless, if the reaction conditions are corrected sufficiently early, for example, if the polymerization temperature or else the rate of Feed of the catalyst into the reactor is reduced the detrimental effects of superactivation, can be limited. Such action can reduce the amount and size of the agglomerates formed to a certain extent, but it will not be possible to prevent a fall, in the production and quality of the polymer manufactured during this period. As a result, it is generally accepted that if it is desired to avoid these disadvantages, the polymerization conditions should be chosen with a safety margin such that hot spots and agglomerates are unlikely to form. However, operating under such conditions leads either to a substantial loss of production or to a deterioration in the quality of the polymer manufactured.

The variations in the progress of the polymerization are of particular concern when using a highly active catalyst, the polymerization activity of which can vary quite considerably for very small variations in the amount of impurities in the polymerization medium. Known highly active catalysts include catalysts of the Ziegler-Natta type based on magnesium, halogen and titanium, vanadium or zirconium. Such variations can also occur when using comonomers capable of activating alpha-olefin polymerization, especially in the case of the copolymerization of ethylene with alpha-olefins containing from 3 to 8 carbon atoms (Polymer Science USSR, vol. 22, 1980, pages 448–454).

A gas phase alpha-olefin polymerization process has now been found which makes it possible to avoid or at least mitigate the afore-mentioned disadvantages. In particular, the process enables polymers to be manufactured continuously with a high productivity and a uniform quality which process is able to accomodate small variations in the progress of the polymerization without the formation of agglomerates.

The present invention therefore relates to a continuous process for the polymerization of an alpha-olefin having from 2 to 12 carbon atoms, which is carried out in a gas phase polymerization reactor by bringing a gaseous reaction mixture, containing the alpha-olefin to be polymerized, into contact with a catalyst system of the Ziegler-Natta type consisting of a solid catalyst comprising at least one compound of a transition metal belonging to groups IV, V or VI of the Periodic Table of the elements, and of a cocatalyst comprising at least one organometallic compound of a metal belonging to groups II or III of the Periodic Table, said process being characterized in that the polymerization reactor is fed with alpha-olefin at a constant rate.

In the present invention, it is generally accepted that a rate is constant if it does not vary by more than 5%, preferably by not more than 2%, and that a ratio of two quantities is constant if it does not vary by more than 10%, preferably by not more than 5%.

According to the present invention, the gas phase polymerization reaction must be carried out in a reactor which is fed with alpha-olefin at a constant rate, as a result of which there are variations in the total pressure of the gaseous reaction mixture and/or the partial pressure of alpha-olefin in the polymerization reactor. It is found, that the process of the invention permits efficient regulation of the polymerization reaction, irrespective of the variations in the progress of the polymerization, thereby avoiding the formation of hot spots and agglomerates. Thus it is observed that a rise or fall in this quantity of heat is automatically counteracted respectively by a fall or rise in the partial pressure of alpha-olefin. More particularly, it has also been found that the polymerization rate is regulated by variations in the partial pressure of alpha-olefin when slight fluctuations occur in the quality of the constituents of the gaseous reaction mixture or the catalyst. One of the advantages of the process is the ability to produce polymer without undue concern for the formation of hot spots and agglomerates due to unavoidable variations in the progress of the polymerization. In view of the pressure variations in the gaseous reaction mixture, another advantage of the process is the ability to manufacture polymers of an uniform quality. Another advantage of the process is that the polymerization is directly regulated by means of the feed rate of alpha-olefin. Advantageously the latter is kept constant during the polymerization with the aid of a flow regulating system.

According to the process of the invention, the total pressure of the gaseous reaction mixture is most frequently between 0.5 and 5 MPa, preferably between 1.5 and 2.5 MPa, and can vary freely, preferably with maximum variations of less than 0.3 MPa and in most cases of the order of 0.1 MPa. However, for general safety reasons, this pressure of the gaseous mixture does not generally exceed a predetermined maximum pressure which depends essentially on the reactor used. The latter can advantageously be vented as soon as the pressure of the gaseous reaction mixture reaches this maximum pressure. Furthermore, the pressure of the gaseous reaction mixture is preferably kept above a predetermined minimum pressure which must permit a minimum and sufficient removal of the heat evolved by the polymerization. When the polymerization is carried out in a fluidized bed reactor, this minimum pressure must also permit a sufficient fluidization velocity to ensure a good fluidization of the polymer particles forming in the fluidized bed. The pressure of the gaseous reaction mixture can be kept above the minimum pressure by introducing an inert gas having a good heat exchange capacity, such as nitrogen, into this gaseous mixture. Said inert gas can be introduced with the aid of a pressure control device. The gaseous reaction mixture generally contains a variable volume of inert gas ranging from 10 to 60%.

According to the process of the invention, the partial pressure of alpha-olefin can also vary freely. However, in order to limit the amount of gas in the polymerization reactor, the partial pressure of alpha- olefin most frequently represents at most 60% and preferably 40% of the maximum pressure of the gaseous reaction mixture. Furthermore, in order to avoid an excessive reduction in the heat exchange capacity of the gaseous reaction mixture and an excessive reduction in the polymerization rate and the production of the polymer, the partial pressure of alpha-olefin generally represents at least 10% and preferably at least 20% of the minimum pressure of the gaseous reaction mixture. When the pressure of alpha-olefin becomes too low or too high, it is modified by using known means for increasing or reducing the polymerization rate, for example by varying the amounts of catalyst and cocatalyst present in the polymerization reactor.

Apart from the alpha-olefin to be polymerized, the gaseous reaction mixture can contain a chain limiter such as, for example, hydrogen. It is preferably introduced into the polymerization reactor at a rate which makes it possible to keep the ratio of the partial pressure of chain limiter to the partial pressure of alpha-olefin constant. This ratio is advantageously kept constant by means of a regulating system which controls the rate of introduction of chain limiter. It is generally less than 3 and most frequently between 0.2 and 2.

The alpha-olefin can be polymerized with one or more different alpha-olefins having from 2 to 12 carbon atoms, which are hereinafter called comonomers and are used in smaller amounts. A comonomer can be introduced into the polymerization reactor at a constant rate. However, to produce a polymer of constant density, a comonomer is preferably introduced into the polymerization reactor at a rate which enables the ratio of the partial pressure of comonomer to the partial pressure of alpha-olefin in the gaseous reaction mixture to be kept constant. This ratio is advantageously kept constant by means of a regulating system which controls the rate of introduction of comonomer. This ratio is generally less than 1 and most frequently between 0.05 and 0.5.

The catalyst system used in the process comprises a solid catalyst containing at least one transition metal compound and, if appropriate, a granular support based on a refractory oxide such as silica or alumina. The solid catalyst can consist of magnesium, a halogen such as bromine or chlorine, titanium and/or vanadium and/or zirconium.

Advantageously, the solid catalyst can be used in the form of a prepolymer. The conversion to a prepolymer is generally effected by bringing the catalyst into contact with one or more alpha-olefins in an amount such that the prepolymer contains between 0.002 and 10 millimol of transition metal per gram. Moreover, these components are brought into contact in the presence of an organometallic compound of a metal belonging to group II or III of the Periodic Table of the elements, in an amount such that the molar ratio of the amount of metal in said organometallic compound to the amount of transition metal is between 0.1 and 50, preferably between 0.5 and 20. The solid catalyst, used direct or after a prepolymerization step, is introduced into the polymerization reactor continuously or intermittently and most frequently at a constant or substantially constant rate.

The cocatalyst used is an organometallic compound identical to or different from that used in the prepolymerization step. It is generally selected from organoaluminium, organozinc or organomagnesium compounds. The cocatalyst can be introduced into the polymerization reactor together with the catalyst and/or separately from the catalyst. The amount of cocatalyst used separately from the catalyst can be introduced into the polymerization reactor at a constant or substantially constant Fate. Alternatively it can be introduced at a rate which enables the molar ratio of the amount of metal in the cocatalyst introduced separately from the catalyst to the amount of transition metal in the catalyst to be kept constant in the polymerization reactor. This ratio can advantageously be kept constant by means of a regulating system which controls the rate of introduction of the cocatalyst. This ratio is generally less than 5 and most frequently between 1 and 2.

The polymerization is carried out continuously in a gas phase polymerization reactor, which can be a reactor with a fluidized and/or mechanically agitated bed, by techniques known per se and using equipment such as that described in French patent n° 2 207 145 or French patent n° 2 335 526. The process is particularly suitable for very large industrial reactors. Generally, the gaseous reaction mixture leaves through the top of the reactor and is recycled to the reactor through a recycle conduit and a compressor. During this recycling the gaseous mixture is generally cooled with the aid of a heat exchanger so as to remove the heat produced during the polymerisation reaction. The polymerization reaction is generally carried out at a temperature of between 0° and 120° C.

The process is suitable for the polymerization of one or more alpha-olefins containing from 2 to 12 carbon atoms, in particular for the polymerization of ethylene or propylene. It is particularly suitable for the copolymerization of ethylene with at least one alpha-olefin containing from 3 to 12 carbon atoms, or for the copolymerization of propylene with at least one alpha-olefin containing from 4 to 12 carbon atoms and, if appropriate, with ethylene and/or an unconjugated diene. The gaseous reaction mixture can contain hydrogen and an inert gas selected for example from nitrogen, methane, ethane, propane, butane, isobutane. When a fluidized bed reactor is used, the fluidization velocity of the gaseous reaction mixture passing through the fluidized bed is preferably from 2 to 8 times the minimum fluidization velocity, i.e. generally from 20 to 80 cm/s. The polymer manufactured is withdrawn from the polymerization reactor continuously or intermittently and, preferably, at a constant rate.

According to the present invention a condition of the process can be kept constant at a predetermined value by means of a process control computer which is connected to means of control capable of maintaining the condition at the predetermined value. This condition can be a ratio between two to partial pressures. It can be also the molar ratio between the amount of metal in the cocatalyst introduced into the reactor seperately from the catalyst, to the amount of transition metal in the catalyst.

The present invention is illustrated below with reference to the drawing, which is a schematic representation of a fluidized bed polymerization reactor suitable for use in the present invention.

The drawing schematically shows a fluidized bed gas phase polymerization reactor (1) consisting essentially of a vertical cylinder (2) surmounted by a disengagement chamber (3) and provided in its lower part with a fluidization grid (4) and with a recycling line (5) connecting the top of the disengagement chamber to the lower part of the reactor, located under the fluidization grid, said recycling line being equipped with a heat exchanger (6), a compressor (7) and feed lines for ethylene (8), butene (9), hydrogen (10) and nitrogen (11). The reactor is also equipped with a prepolymer feed line (12) and a withdrawal line (13). This reactor operates in such a way that the flow rate of ethylene entering the system via the line (8) is constant.

The examples below illustrate the present invention.

EXAMPLE 1

Manufacture of a High-density Polyethylene

The operation was carried out in a fluidized bed gas phase polymerization reactor such as that shown schematically in the drawing, which consisted of a vertical cylinder 45 cm in diameter and 6 m in height.

Above the fluidization grid, the reactor contained a fluidized bed kept at 95° C., which had a height of 2 m and consisted of 100 kg of a high-density polyethylene powder in the process of being formed. A gaseous reaction mixture containing ethylene, but-1-ene, hydrogen, nitrogen and ethane, the pressure of which was allowed to vary between 1.95 and 2.05 MPa, passed through this fluidized bed with an ascending fluidization velocity of 0.50 m/s.

A catalyst identical to that described in Example 1 of French patent n° 2 405 961 was introduced intermittently with time into the reactor; said catalyst contained magnesium, chlorine and titanium and had been converted beforehand to a prepolymer containing 25 g of polyethylene per millimol of titanium and an amount of tri-n-octylaluminium (TnOA) such that the molar ratio Al/Ti was equal to 1.00±0.05, and consisting of particles with a weight-average diameter of 200 microns. The rate of introduction of the prepolymer into the reactor was kept constant at 195 g/h.

During the polymerization, ethylene was introduced into the reactor at a regulated and constant rate of 25 kg/hour, hydrogen was introduced so as to keep the ratio of the partial pressure of hydrogen to the partial pressure of ethylene constant at 0.75 in the gaseous reaction mixture, and but-1-ene was introduced so as to keep the ratio of the partial pressure of but- 1-ene to the partial pressure of ethylene constant at 0.02 in the gaseous reaction mixture.

Under these conditions, 25 kg/h of a polyethylene was produced which had a specific gravity of 0.960, a melt flow index, measured at 190° C. under a load of 2 kg, of 7 g/10 minutes and a titanium content of 15 ppm, and which consisted of particles with a weight- average diameter of 990 microns. It was observed over several days of continuous polymerization that the production of polymer remained constant at 25 kg/h, without the Formation of agglomerates, and that the quality of the high-density polyethylene manufactured by this process remained constant and very satisfactory, despite variations in the polymerization conditions and especially despite the random variations in the activity of the catalyst and the unpredictable and not easily detectable fluctuations in the impurities brought in by the ethylene, the but-1-ene and the Other constituents of the gaseous reaction mixture.

EXAMPLE 2

Manufacture of a Linear Low-density Polyethylene

The operation was carried out in a fluidized bed gas phase polymerization reactor such as that shown schematically in the drawing, which consisted of a vertical cylinder 90 cm in diameter and 6 m in height. Above the fluidization grid, the reactor contained a fluidized bed kept at 80° C., which had a height of 2.50 m and consisted of 450 kg of a linear low-density polyethylene powder in the process of being formed. A gaseous reaction mixture containing ethylene, but-1-ene, hydrogen, nitrogen and ethane, the pressure of which was allowed to vary freely between 1.95 and 2.05 MPa, passed through this fluidized bed with an ascending fluidization velocity of 0.50 m/s.

A catalyst identical to that described in Example 1 of French patent n° 2 405 961 was introduced intermittently with time into the reactor; said catalyst contained magnesium, chlorine and titanium and had been converted beforehand to a prepolymer containing 40 g of polyethylene per millimol of titanium and an amount of tri-n-octylaluminium (TnOA) such that the molar ratio Al/Ti was equal to 0.80±0.05, and consisted of particles with a weight-average diameter of 230 microns. The rate of introduction of the prepolymer into the reactor wag kept constant at 700 g/h.

During the polymerization, ethylene wag introduced into the reactor at a regulated and constant rate of 100 kg/hour, hydrogen wag introduced so as to keep the ratio of the pressure of hydrogen to the partial pressure of ethylene constant at 0.45 in the gaseous reaction mixture, and but-1-ene was introduced so as to keep the ratio of the partial pressure of but-1-ene to the partial pressure of ethylene constant at 0.20 in the gaseous reaction mixture. 40.25 millimols per hour of triethylaluminium was also introduced into the reactor at a constant rate.

Under these conditions, 105 kg/h of a polyethylene wag produced which had a specific gravity of 0.920, a melt flow index, measured at 190° C. under a load of 2 kg, of 1 g/10 minutes and a titanium content of 8 ppm, and which consisted of particles with a weight- average diameter of 1200 microns. It was observed over several days of continuous polymerization that the production of polymer remained constant at 105 kg/h, without the formation of agglomerates, and that the quality of the linear low-density polyethylene manufactured by this process remained constant and very satisfactory, despite variations in the polymerization conditions and especially despite the random variations in the activity of the catalyst and the unpredictable and not easily detectable fluctuations in the impurities brought in by the ethylene, the but-1-ene and the other constituents of the gaseous reaction mixture.

We claim:

1. A continuous process for the polymerization of an alpha-olefin having from 2 to 12 carbon atoms, which is carried out in the absence of a retarder in a gas phase polymerization reactor by bringing a gaseous reaction mixture, comprising the alpha-olefin to be polymerized, into contact with a catalyst system of the Ziegler-Natta type consisting of a solid catalyst comprising at least one compound of a transition metal belonging to groups IV, V, or VI of the Periodic Table of the elements, and of a cocatalyst comprising at least one organometallic compound of a metal belonging to groups II or III of the Periodic Table, said process being characterized in that the polymerization reactor is continuously fed with alpha-olefin at a constant rate, and in that the total pressure of the gaseous reaction mixture is from 0.5 to 5 MPa and can vary between a predetermined maximum pressure and a predetermined minimum pressure and the polymerization rate is regulated by variations in the partial pressure of the alpha-olefin in the polymerization reactor.

2. A process according to claim 1, characterized in that the feed rate of alpha-olefin is kept constant with the aid of a flow regulating system.

3. A process according to claim 1, characterized in that a chain limiter is introduced into the polymerization reactor to keep the ratio of the partial pressure of chain limiter to the partial pressure of alpha-olefin constant.

4. A process according to claim 1, characterized in that a comonomer is introduced into the polymerization reactor so as to keep the ratio of the partial pressure of comonomer to the partial pressure of alpha-olefin constant in the gaseous reaction mixture.

5. A process according to claim 1, characterized in that the catalyst is introduced into the polymerization reactor continuously or intermittently at a constant rate.

6. A process according to claim 1, characterized in that an amount of cocatalyst is introduced into the polymerization reactor, separately from the catalyst, at a rate which enables the molar ratio of the amount of metal in the cocatalyst introduced separately from the catalyst to the amount transition metal in the catalyst to be kept constant in the polymerization reactor.

7. A process according to claim 1, characterized in that the catalyst is a catalyst of the Ziegler-Natta type based on magnesium, halogen, titanium and/or vanadium and/or zirconium.

8. A process according to claim 1, characterized in that the catalyst is introduced into the polymerization reactor in the form of a prepolymer.

9. A process according to claim 1, characterized in that the polymerization is carried out in a fluidized bed reactor under a pressure of 0.5 to 5 MPa and at a temperature of between 0° and 120° C.

10. A process according to claim 1, characterized in that a condition of the process is kept constant at a predetermined value by means of a process control computer.

11. A process according to claim 1, wherein the total pressure varies less than 0.3 MPa.

12. A process according to claim 1, wherein the total pressure varies less than 0.1 MPa.

13. A process according to claim 1, wherein the total pressure of the gaseous reaction mixture is from 1.5 to 2.5 MPa.

* * * * *

UNITED STATES PATENT AND TRADEMARK OFFICE
CERTIFICATE OF CORRECTION

PATENT NO. : 5,534,607
DATED : July 9, 1996
INVENTOR(S) : ANDRE MARTENS et al

It is certified that error appears in the above-indentified patent and that said Letters Patent is hereby corrected as shown below:

Col. 4- l. 33, correct the spelling of the word "rate"

Col. 6, l. 41, correct the spelling of the word "was"

Col. 6, l. 42, correct the spelling of the word "was"

Col. 6, l. 44, correct the spelling of the word "was"

Col. 6, l. 52, correct the spelling of the word "was"

Signed and Sealed this

Eighteenth Day of February, 1997

Attest:

BRUCE LEHMAN

Attesting Officer

Commissioner of Patents and Trademarks